United States Patent

[11] 3,628,034

| [72] | Inventors | Vladimiro Ern;<br>Richard E. Merrifield, both of Wilmington, Del. |
|---|---|---|
| [21] | Appl. No. | 50,104 |
| [22] | Filed | June 26, 1970 |
| [45] | Patented | Dec. 14, 1971 |
| [73] | Assignee | E. I. du Pont de Nemours and Company<br>Wilmington, Del. |

[54] DEVICE TO DETECT MOTION AND MEASURE SPEED FROM THE DELAYED FLUORESCENCE OF AROMATIC COMPOUNDS
10 Claims, 10 Drawing Figs.

[52] U.S. Cl............................................ 250/225,
250/71 R, 250/219 IDD, 250/231 R, 250/231 SG, 250/237
[51] Int. Cl............................................. G02f 1/18
[50] Field of Search........................................250/225, 71 R, 71.5 R, 231, 231 SG, 219 ID, 237 G; 356/28

[56] References Cited
UNITED STATES PATENTS
3,175,093  3/1965  De Lang...................... 250/231 X
3,052,405  9/1962  Woodland..................... 250/219 ID X

*Primary Examiner*—James W. Lawrence
*Assistant Examiner*—Morton J. Frome
*Attorney*—James H. Ryan

ABSTRACT: Motion is detected or speed is measured by producing an image of the moving object or series of objects in a material which displays the phenomenon of delayed fluorescence and measuring the intensity of the delayed fluorescence, or modulating the intensity of the imaging light and measuring the phase shift of the resulting modulation of the delayed fluorescence. A device for the above comprises a crystalline material which displays the phenomenon of delayed fluorescence, a light source directed at this crystalline material, and a photomultiplier tube to measure the intensity of the delayed fluorescence, or a mechanical chopper to modulate the intensity of the imaging light and two photomultiplier tubes, a tracking filter and a digital phase meter to measure the phase shift of the resulting modulation of the delayed fluorescence.

INVENTORS
VLADIMIRO ERN
RICHARD E. MERRIFIELD

Patented Dec. 14, 1971 3,628,034

INVENTORS
VLADIMIRO ERN
RICHARD E. MERRIFIELD

INVENTORS
VLADIMIRO ERN
RICHARD E. MERRIFIELD

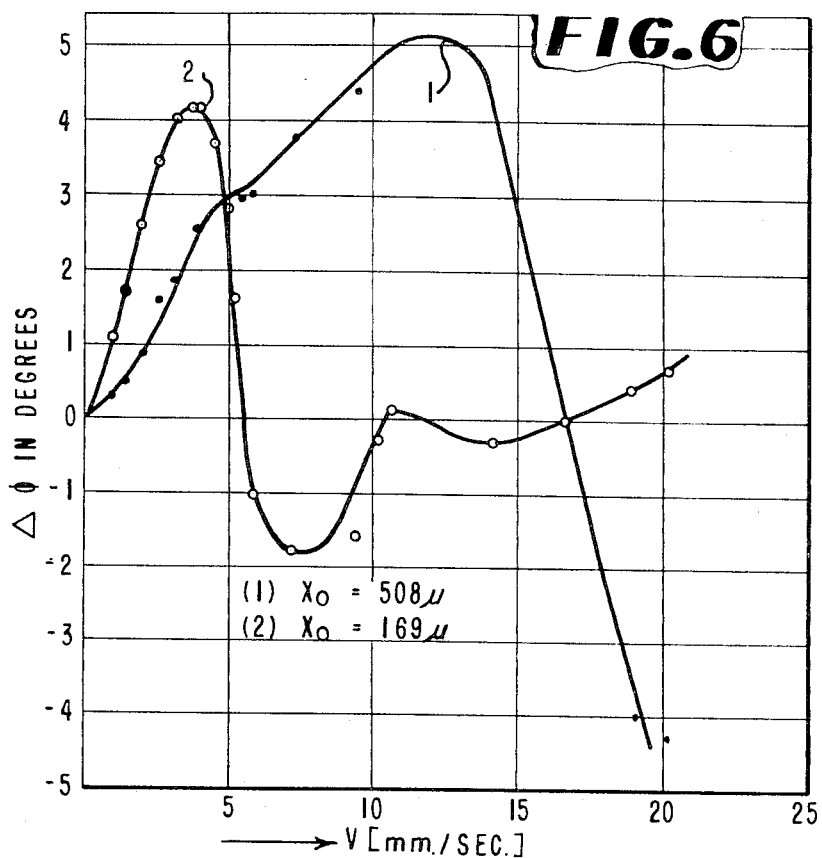
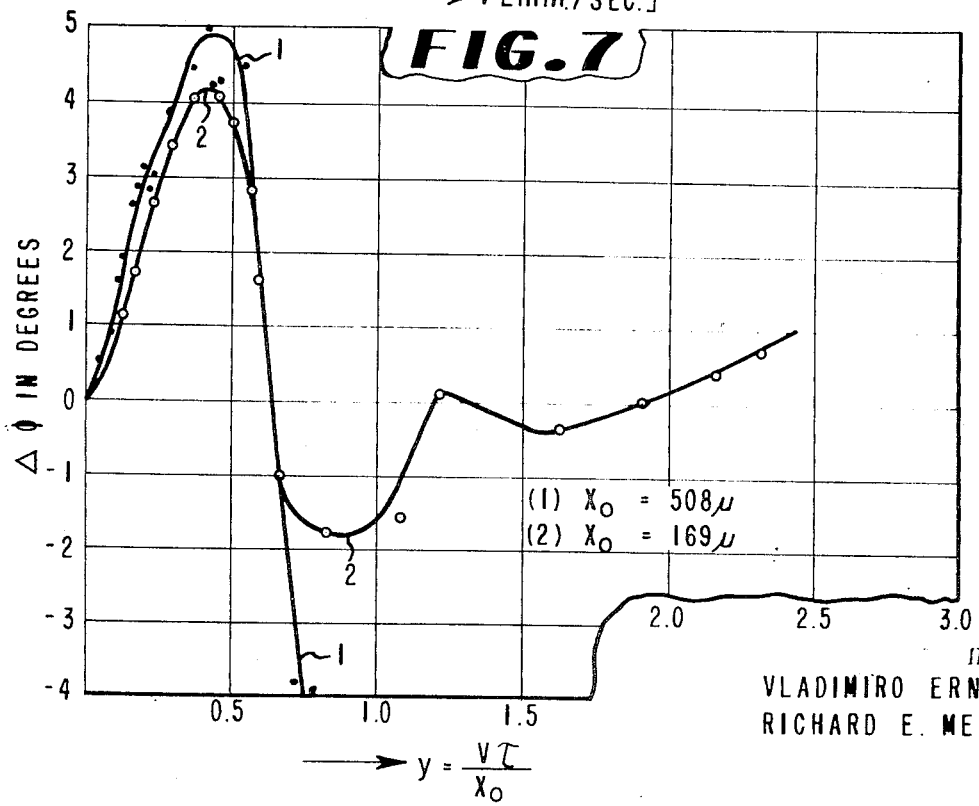

Patented Dec. 14, 1971 3,628,034
5 Sheets-Sheet 5
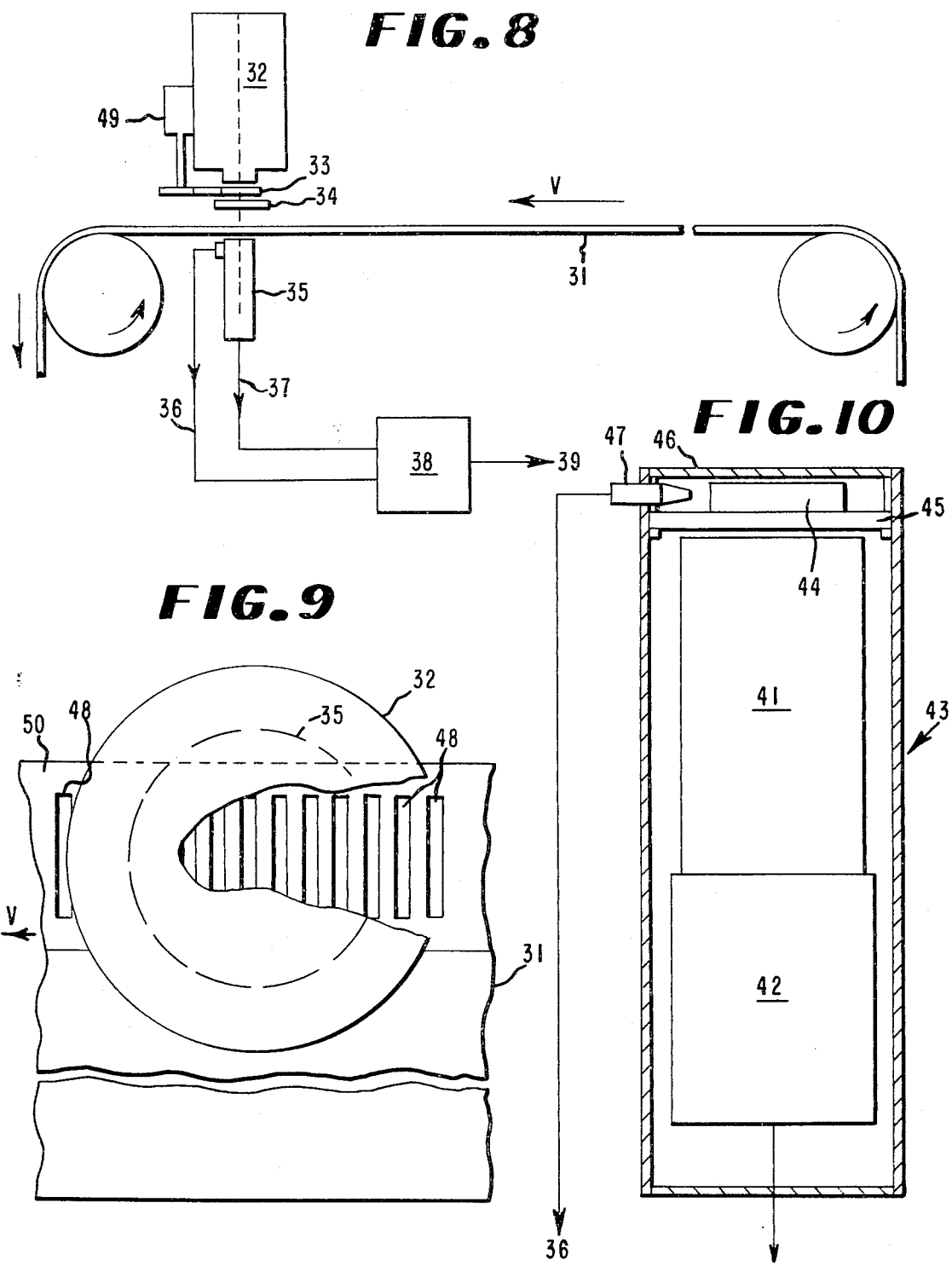
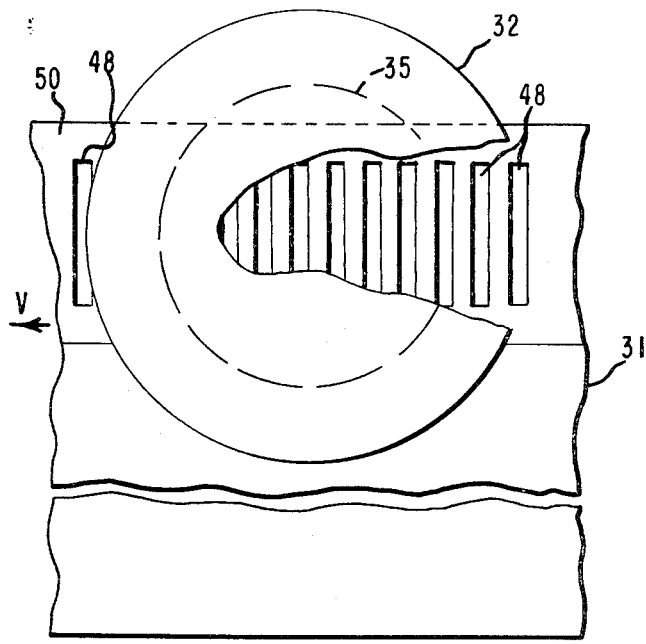
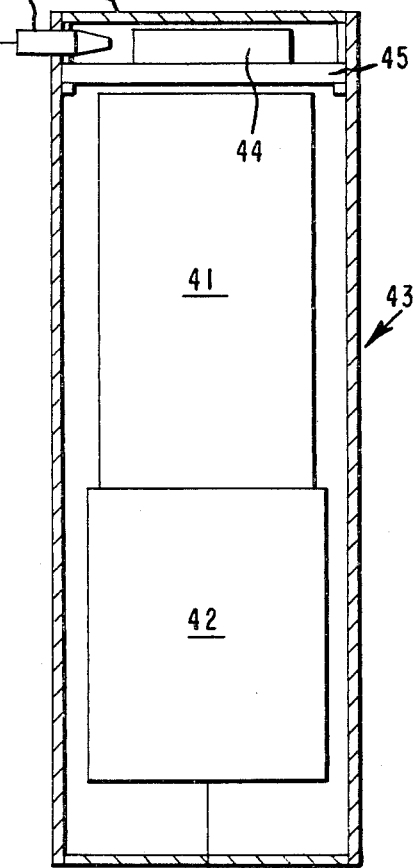
INVENTORS
VLADIMIRO ERN
RICHARD E. MERRIFIELD

DEVICE TO DETECT MOTION AND MEASURE SPEED FROM THE DELAYED FLUORESCENCE OF AROMATIC COMPOUNDS

BACKGROUND OF THE INVENTION

1. Field of the Invention

This invention relates to a method and device to detect motion and measure speed. More particularly this invention relates to photoelectric methods and devices for detecting motion or measuring speed utilizing the delayed fluorescence of aromatic compounds.

2. Description of the Prior Art

In a conventional method of photoelectric detection of movement, the image or object in motion passes through the light path of a primary photocell, thereby generating an electric signal at some time, $t_1$. In order to determine the speed of said object, it must continue to move until it passes through the light path of a secondary photocell, at a known distance, $X$, from the primary photocell, thereby generating an electric signal at some time, $t_2$. The velocity is given by the relation $$X/(t_2-t_1),$$

and represents an average speed of the moving object.

The method of the present invention depends upon the property of certain materials which display delayed fluorescence due to the mutual annihilation of triplet excitons: delayed fluorescence is proportional to the integral of the square of the exciton density. By contrast, ordinary fluorescence is proportional to the integral of the exciton density, or to the total exciton number.

The exciton has been studied extensively, both theoretically and experimentally. See, for example, Dexter and Knox, *Excitons*, Interscience Publishers, Inc., New York (1964), and Knox in *Solid State Physics*, Academic Press, New York, Suppl. 5 (1963). The triplet–triplet annihilation process is discussed in some detail by R. G. Kepler, J. C. Caris, P. Avakian and E. Abramson, Phys. Rev. Letters, 10, 400 (1963), and by P. Avakian and E. Abramson, J. Chem. Phys. 43, 821 (1965). The process of triplet-triplet annihilation in fluid systems is described by C. A. Parker, *The Triplet State*, A. B. Zahlan, Ed., pp. 353–359, The University Press, Cambridge (1967).

SUMMARY OF THE INVENTION

According to the present invention, there is provided a process of detecting motion or measuring the instantaneous speed of an object or a series of objects, or measuring the average size of an object, or a series of objects, this process comprising projecting with light of a periodically modulated intensity the image of a moving object, or series of objects on a crystalline material in which radiation can produce triplet excitons which subsequently generate delayed fluorescence by mutual annihilation, measuring the phase shift of the resulting time modulation of the delayed fluorescence with respect to that of the exciting light, and calculating from said phase shift the instantaneous speed of the object or the distance between two points on the object.

In another embodiment of the process of the present invention light of constant intensity is used, the step of modulating the intensity is omitted and the intensity of the delayed fluorescence is measured instead of the phase shift for the calculation of the instantaneous speed of the object or the distance between two points on the object.

According to the present invention, there is further provided a device for detecting motion or measuring speed or average size comprising a crystalline material in which radiation can produce triplet excitons which subsequently generate delayed fluorescence by mutual annihilation, optical means for directing light onto said crystalline material, first mounting means holding said crystalline material and said optical means in fixed relation, means for periodically modulating the intensity of the light, second mounting means holding the modulating means in the path of the light, and means for measuring the phase shift of the resulting time modulation of the delayed fluorescence with respect to that of the exciting light.

Another embodiment of the device of the present invention comprises a crystal in which radiation can produce triplet excitons which subsequently generate delayed fluorescence by mutual annihilation, optical means for directing light of constant intensity onto said crystal, mounting means holding said crystal and the optical means in fixed relation, and means for measuring the intensity of the delayed fluorescence.

BRIEF DESCRIPTION OF THE DRAWINGS

FIG. 6 is a plot of $\Delta\Phi_1$, versus image speed, $v$, for different spatial periodicities of the image.

FIG. 7 is a plot of the results of FIG. 6, but as a function of $y = v\tau/x_o$.

FIG. 8 is a side view of a device of the present invention as applied to determine speed in a continuous manufacturing process.

FIG. 9 is an enlarged detail top view of the device of FIG. 8.

FIG. 10 is an enlarged detail side view of the speed-sensing unit of FIG. 8.

DESCRIPTION OF THE PREFERRED EMBODIMENTS

Figure 1:
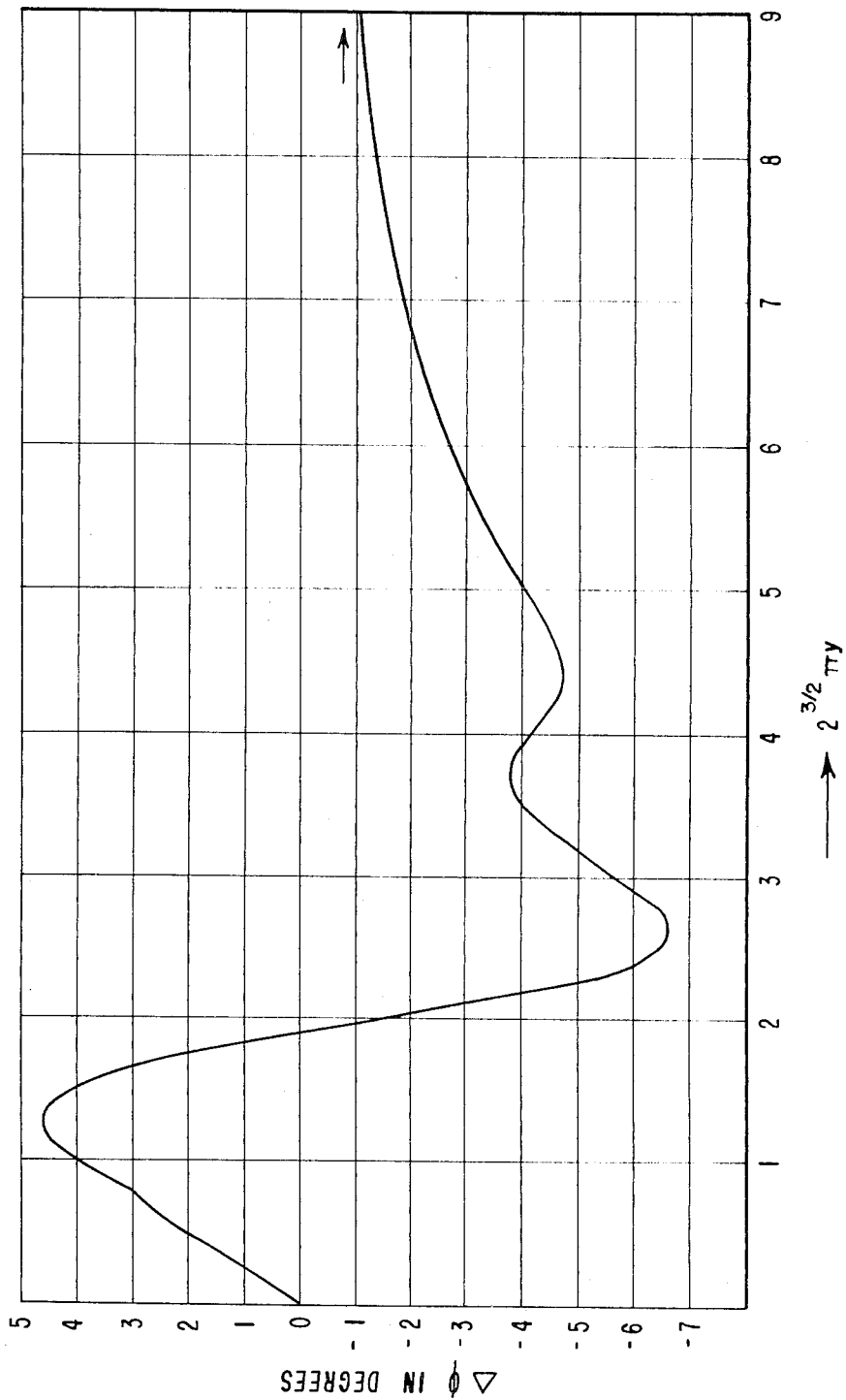
FIG. 1 is a plot of phase shift change $\Delta\Phi_1$, as a function of reduced velocity, $y = v\tau/x_o$.

By the method of this invention image or object speed is measured as a function of the intensity or phase shift of the delayed fluorescence emitted by a crystal where the photon flux from the moving image creates triplet excitons and where mutual annihilation of triplets takes place. A unique feature of the process is that speed is detected even if the photon flux exciting the crystal is conserved during the motion.

The detection means of the invention consist essentially of (1) optical means for producing an image in (2) a material in which the imaging radiation can produce triplet excitons which subsequently produce delayed fluorescence by mutual annihilation, and (3) means for measuring the intensity of this delayed fluorescence, or means for modulating the intensity of the imaging light and for measuring the phase shift of the resulting modulation of the delayed fluorescence.

In its various embodiments such a device can serve to (1) detect intermittent or continuous motion within the image field, (2) detect any deviation from uniform motion within the image field, (3) measure the velocity of motion of all or part of the image, or (4) measure the acceleration of all or part of the image.

In one embodiment of the invention, the intensity of the delayed fluorescence is measured and the image speed inferred. In this form it is necessary that the intensity of the image be constant. In another embodiment the intensity of the image is modulated by the device (e.g., by a mechanical chopper) and the phase shift of the delayed fluorescence relative to the image modulation is used as a measure of image speed. In this form changes of image intensity do not affect operation of the device, within certain limits. This form is more sensitive to changes in velocity than the first embodiment and is applicable to a greater range of velocities.

By the method of the first embodiment a crystal which displays the phenomenon of delayed fluorescence is illuminated by means of collimated light through a very narrow linear slit which moves with a velocity $v$ in a direction perpendicular to the slit and parallel to the crystal surface. Obviously, the slit could move in a different direction, however, the velocity determined would still be the vector component in the direction parallel to the crystal surface and perpendicular to the slit. From this component the actual velocity can be calculated, provided the direction of motion is known. The slit is assumed to be narrow compared to the length $v\tau$, where $\tau$ is the triplet exciton lifetime. The light source is assumed to be constant in intensity. In the absence of exciton diffusion, the exciton density $n(x,t)$ at any time $t$, where position $x$ is measured along the direction of motion, is given by $$n(x, t) = (A/v) \exp[(x-vt)/v\tau] \text{ for } X < vt$$
$$= 0 \qquad\qquad X > vt \quad (1)$$

where $A$ is a constant depending on the light intensity, absorption coefficient, crystal thickness, and slit width. The area under (1), giving the amount of ordinary fluorescence, is equal to $A\tau$, independent of $v$. The delayed fluorescence, on the other hand, is proportional to $$\int_{-\infty}^{\infty} n^2(x, t) dx = A\tau/(2v) \quad (2)$$

and is quite sensitive to velocity. The presence of diffusion in this example limits this sensitivity for small velocities. Since diffusion only leads to a redistribution of the excitons, insensitivity of ordinary fluorescence to velocity remains valid. The delayed fluorescence, however, now becomes proportional to
$$\tfrac{1}{2}A\tau/(v^2+4D/\tau)^{1/2}, \quad (3)$$
where $D$ is the triplet exciton diffusion constant. This expression becomes insensitive for velocities small compared to
$$2(D/\tau)^{1/2};$$
if the delayed fluorescence intensity can be determined within a 1 percent accuracy, then velocities below about $0.3(D/\tau)^{1/2}$ are not detectable. This limiting velocity may be as low as (for $D \approx 10^{-5}$ cm.$^2$sec.$^{-1}$ and $\tau = 1$ sec.) $10^{-3}$ cm./sec. for a suitably chosen crystal. The lower limit on measurable velocities will remain applicable in the examples to follow, since exciton densities in all of these can be obtained as superpositions of the exciton densities in the example just given. We shall present results only in the limit of negligible $D$, i.e., when $v$ is large compared to
$$2(D/\tau)^{1/2},$$
keeping in mind that lower velocities, up to a limit, can be determined with the aid of more complex expressions.

The sensitivity of the above arrangement can be improved by passing collimated light of constant intensity through a Ronchi ruling, consisting of straight parallel strips of width $1/2x_0$, of alternately opaque and transparent areas. The velocity effect takes place in a transition region between an illuminated and a nonilluminated area; the ruling provides many such transition regions while permitting the achievement of greater total intensity of the delayed fluorescence. The example of the moving ruling best illustrates the utility of the velocity-detection method for a case in which the total light intensity incident on a given image field remains nearly constant, while the image pattern itself is moving. The speed of the single moving slit could have been determined by measuring the time elapsed between the times the slit appeared in and disappeared from the image field, at which times there would be a sudden change in the total intensity. This technique would not work for a long periodic pattern continuously moving across the image field.

The delayed fluorescence produced via the moving ruling is proportional to the quantity
$$1-(2v\tau/x_0)\tanh(x_0/4v\tau). \quad (4)$$
This expression becomes insensitive to velocities small compared to $x_0/\tau$, as well as large compared to this velocity. A 1 percent detectability in the delayed fluorescence limits the range of measurable velocities to
$$0.005 x_0/\tau < v\ 2x_0/\tau. \quad (5)$$
Note that this range can be varied not only by changing the ruling spacing $x_0$ but also by changing $\tau$, via an appropriate choice of material.

For the smallest available $x_0$ in rulings ($x_0 \approx 10\mu$) and greatest values of $\tau$ ($\tau \approx 1$ sec.), the lower limit in (5) is well below attainable values of the diffusion velocity
$$(D/\tau)^{1/2}$$

so that the latter provides the practical lower limit on detectable velocities (i.e., about $10^{-3}$ cm./sec.). For the upper limit, $x_0$ will in practice be limited to perhaps 1 mm. if it is to be small compared to a typical crystal size (around 1 cm.$^2$); then a minimum value of $\tau = 10^{-4}$ sec. gives as the upper limit to the range of velocities the value $2 \times 10^3$ cm./sec., or about 40 m.p.h. Note, however, that (5) restricts the range of detectable velocities for any given crystal and any given $\tau$.

By the method of the second embodiment, collimated light passing through a moving ruling is modulated by rotating a linear polarizer placed between two fixed polarizers set for maximum transmission and varies as $\cos^4 \pi f t$, where $0.5f$ is the frequency of rotation. The delayed fluorescence in this case contains components at frequencies $0, f, 2f, 3f$, and $4f$. It is possible experimentally to separate these components and to measure a phase shift corresponding to each frequency.

The phase shift $\Phi_1$ of the first harmonic (frequency $f$) is given by $$\Phi_1 = \arctan[ImF/ReF] \quad (6)$$

where the complex number $F$ is given by
$$F = 6A_{1,0} + 2A_{2,-1}$$
where $$A_{j,1} = (\beta_j \beta_1)^{-1} - 2y(\beta_j + \beta_1)^{-1} [\tanh(\beta_j/4y)/\beta_j^2$$
$$+ \tanh(\beta_1/4y)/\beta_1^2]$$

with $\beta_j = 1 + i(2\pi f \tau j); y = v\tau/x_0$.

The phase shift change, $\Delta\Phi_1$, in degrees, has been plotted in FIG. 1, for $f\tau = 0.46$, as a function of the reduced velocity $y$ multiplied by the constant $2^{3/2}\pi$. Zero-velocity phase shift $\Phi_1(v=0) = -69.50°$. Particularly significant is the structure displayed in the velocity dependence, as contrasted with the relatively smooth velocity dependence for cases involving steadily illuminated images (first embodiment). This structure leads to greater velocity sensitivity, particularly in the region near the velocity at which the phase shift equals the zero-velocity phase shift ($2^{3/2}\pi y \approx 2$ in the figure), and makes this method useful for detecting small changes in velocity. The overall range of detectable velocities is determined by the accuracy with which phase shifts can be measured. With present equipment, an accuracy of $0.2°$ is attained, which yields approximately the following range of detectability of velocities: c $0.003\,x_0/\tau\ v\ 8\,x_0/\tau.\quad (7)$ This range is an order of magnitude greater than that of the first embodiment, for any given crystal and ruling. The absolute lower limit is still set by the diffusion velocity, whereas the upper limit is roughly a factor of 4 greater than before, i.e. $10^4$ cm./sec. = 200 m.p.h. For any given crystal and ruling, (7) gives a range of detectable velocities covering as much as a factor of $3 \times 10^4$.

Figure 2:
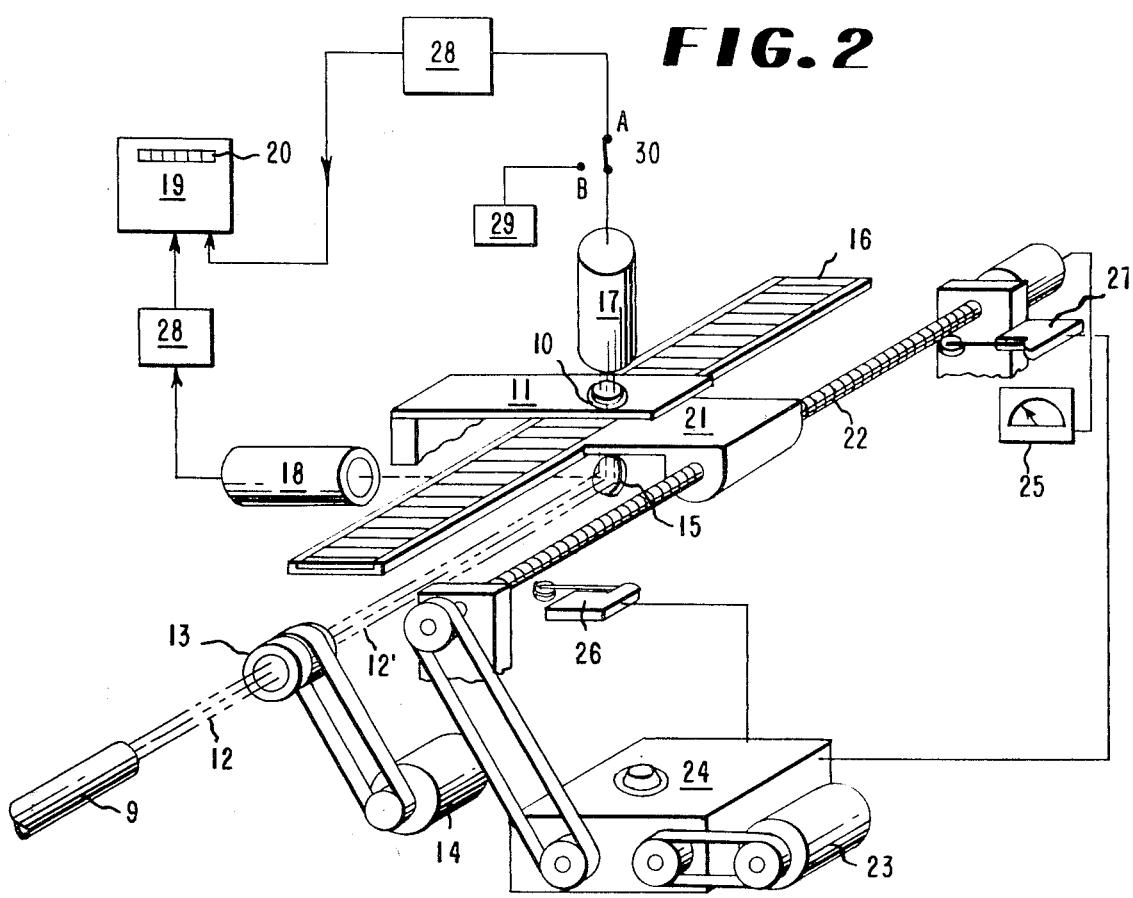
FIG. 2 is a drawing of a typical apparatus of the present invention.

A typical apparatus of the present invention is pictured in FIG. 2. The following detailed discussion describes the operation of the second embodiment as discussed above; however, the modifications necessary to the first embodiment are also discussed.

Light source 9 (e.g., a He–Ne laser) provides a collimated beam for excitation of triplet excitons in an organic crystal 10 (e.g., anthracene) mounted on a stationary support 11. The light beam 12 passes through a mechanical chopper 13 driven by a motor 14 at a known frequency (typically, 10–100 c.p.s.). The chopper 13 can consist of a rotating wheel with a 180° cutout sector (this provides a square wave exciting waveform) or of a rotating linear polarizer placed in between two polarizers set for maximum transmission (this provides a cosine to the fourth power exciting waveform). The intensity-modulated beam 12' is deflected 90° by a mirror 15 and falls onto the face of a stationary organic crystal 10 after passing through a moving ruling 16 consisting of alternate transparent and opaque strips of equal width on a glass substrate (commercially supplied). Spatial-intensity distribution of light reaching the crystal 10 follows closely that of an image of the ruling 16. Motion of the ruling creates a corresponding movement of the shadow pattern across the crystal and the system is equivalent in all respects to an image scanning a stationary organic solid. Typically the organic material is an *ab* plane cleaved anthracene platelet of dimensions 1 × 1 × 0.2 cm., and is placed about ½mm. above the ruling.

The blue delayed fluorescence due to triplet-triplet annihilation is detected by photomultiplier (PM) tube 17 (RCA 6199 with Corning filters C.S. 5-57, 5-56, and 4-72), and simultaneously the exciting light waveform is observed by photomultiplier tube 18 (RCA 6199 with C.S. 2-59 and 1069 filters). PM tube 17 is placed in close vicinity to the crystal. Position of PM tube 18 is not critical since a small fraction of exciting light (e.g., as scattered from any optical component in the beam) is sufficient to provide an adequate reference signal. With switch 30 in position A the signals from the two photomultipliers are fed, via operational amplifiers 28 (e.g., Tektronix Type O) to the two channels of a tracking filter 19 (Ad-Yu Electronics, Type 1034) and digital phase shift meter 20 (Ad-Yu Electronics, Type 524A3) where the phase shift (or phase lag or phase angle) of the delayed fluorescence waveform (a function of image speed) with respect to the exciting waveform is measured. The tracking filter 19 is driven in the usual manner by a synchronous converter tuned to the first harmonic of the excitation frequency (e.g., for the rotating linear polarizer the double of the mechanical frequency of rotation).

Motion of the ruling at a fixed speed is achieved with a simple electromechanical unit. Rulings (typical dimension normal to the ruling lines is 25 cm.) are placed in a slider 21 which is advanced, normal to the ruling lines, by a lead screw 22 driven by a variable speed motor 23 through a variable reduction-multiplication gearbox 24. Revolutions per minute (r.p.m.) of lead screw are monitored with a conventional tachometer 25. Reverse switches 26 and 27 provide reverse of ruling motion at each end of travel. Measurements are independent of sense of motion. The moving ruling, crystal, and PM tube 17 are enclosed in a lighttight box (not shown) to avoid interference with ambient light. Exciting beam is admitted through a red filter (not shown) (e.g., C.S. 2-61) on one side of the enclosure.

With switch 30 in position B and removing or rendering inoperative the mechanical chopper 13 and the photomultiplier tube 18, the apparatus operates by the method of the first embodiment. The constant intensity beam produces a DC delayed fluorescence signal which is fed to a picoammeter or recorder 29 where the fluorescence intensity at a given speed of the image is recorded.

Some of the details of the apparatus described above can be modified in several ways to accommodate to a particularly desirable arrangement. It will be obvious to those skillful in the art that these modifications in no way will alter the basic principles of operation. As an example, the 90° beam-bending mirror 15 could be removed from the system, and the exciting source and mechanical chopper 13 placed below the detecting system; or the beam can be maintained horizontal and the moving ruling and detector placed normal to it (motion of image in a vertical plane). Another example can be that the moving ruling 16 is inserted in a lens system which is placed in the beam path. The lens system forms then, in conventional manner, an image (magnified or reduced) of the ruling on the crystal at some distance away. In this arrangement the mechanical chopper 13 can be placed physically in the beam path either before or after the moving ruling. The organic crystal can be directly attached to the face of photomultiplier 17 forming with it a single detecting unit.

Although the above discussion used specific geometrics of the image (object), the principles involved can be readily extended to images of arbitrary shape and distribution of light intensities. For the case where the nature of the image is unknown a priori, it is not possible to obtain a determination of its precise speed. In that case, the method is useful for detecting a change of the speed of the image, particularly with the phase detection technique, which can be quite sensitive to such changes. To measure the speed of a general image, one has at least to know an average size of objects (along the direction of motion) in this image as well as the range of sizes. The average size will then be equivalent to $x_o$ for the case of the moving ruling. The formulas for the delayed fluorescence intensity will be very similar to (4) or (6), except that the sensitivity to changes in velocity will be reduced, the greater the range of object sizes in the image.

The method of detection of the velocity of a moving ruling is equivalent to a determination of the ruling spacing $x_o$, if the velocity $v$ is known, since formulas (4) and (6) involve both $x_o$ and $v$. In fact, since only the ratio $v/x_o$ of these quantities occurs in these formulas, the sensitivity to $x_o$ is the same as the sensitivity to $v$. The range of measurable spacings for the phase-detecting technique is (see equation 7):

$$v\tau/8 \; x_o \; 300v\tau. \quad (8)$$

The overall lower limit, for any $v$ or $\tau$, is set by the limitation $v$ $0.3(D/\tau)^{1/2}$ and is (for $D = 10^{-5}$ cm.$^2$sec.$^{-1}$ and $\tau = 1$ sec.) about $10\mu$. The upper limit is determined primarily by the size of the crystal detector; values exceeding 1 mm. are probably impractical. As before, this method need not be restricted to rulings but can be applied to general images where it is desired to determine an average object dimension along the direction of motion of a moving image.

The study of an image which moves back and forth in an oscillatory fashion operates basically on the same principle as the techniques discussed; in effect, an average magnitude of the velocity is detected, provided the amplitude of oscillation is comparable to an average object size along the direction of motion. For a known frequency of oscillation, this amounts to a measurement of the amplitude of oscillation. This technique has the further advantage that certain phase shifts can be measured without additional modulation of the incident light.

The above embodiments of the invention work in conjunction with any material which displays the phenomenon of delayed fluorescence. Materials in which delayed fluorescence has been observed include anthracene, 9,10-diphenylanthracene, 2-chloroanthracene, 2,t-butylanthracene, 1,8-dichloroanthracene, 1,5-dichloroanthracene, 4,5-iminophenanthrene, phenanthrene, 4,5-methylenephenanthrene, naphthalene, 1,4-dibromonaphthalene, pyrene, p-terphenyl, trans-stilbene, 4,4'-dimethoxystilbene, 9,9-bianthryl, tetracene and 2-bromofluorene. The material properties which govern the range and sensitivity of the speed detection device are the triplet exciton lifetime $\tau$ and the diffusion constant $D$. The maximum achievable values of $\tau$ approach 1 sec.; there is in principle no minimum, as $\tau$ can be arbitrarily reduced by doping a given crystal with appropriate impurities. Short lifetimes, however, make it difficult to generate observable densities of triplet excitons and in practice limit useful $\tau$'s to values in excess of $10^{-4}$ sec. The range of diffusion constants is between $10^{-5}$ and $10^{-3}$ cm.$^2$sec.$^{-1}$.

Excitation of delayed fluorescence in molecular crystals requires typically irradiation powers of the order of ¼–3 milliwatts/cm.[2] in the wavelength band corresponding to the singlet–triplet absorption spectrum of the material (e.g., anthracene between 6,800 and 5,500 A., naphthalene between 4,700–4,200 A.). These light intensities are readily obtainable from the filtered output of a xenon or mercury arc lamp (e.g., 100 watts) or from commercial CW gas lasers (e.g., He–Ne, He–Cd, ionized argon) of few milliwatts power. Monochromaticity and collimation of the laser beam allows a more efficient use of the available excitation power. Monochromaticity of the beam relaxes the filtering requirements for photoelectric detection of delayed fluorescence. Initial collimation of the laser beams allows changes in beam size and projection of images of an object on the crystalline material by conventional optical means without appreciable sacrifice of exciting intensity.

Delayed fluorescence is detected with a commercial photomultiplier (e.g., RCA 6199, EMI 9634, etc.) operating in a conventional manner. The photomultiplier face is shielded by appropriate color filters to reject the exciting light and pass only the wavelengths of fluorescence (e.g., for anthracene, Corning filters C.S. 5–56 + 5 − 57 + 4.72; for naphthalene, Corning filters C.S. 7 − 60 + 7 − 60). The photomultiplier output is an electrical current proportional to delayed fluorescence intensity. For measurements with constant intensity of excitation the DC current (typically $10^{-8}$ – $10^{-6}$ amperes) is measured by conventional means, e.g., with a picoammeter, recorder, etc. Since only relative changes in delayed fluorescence level are necessary for speed measurement, no absolute calibration of the photomultiplier output is required. For measurements with periodically modulated light the AC currents from the photomultiplier detecting the delayed fluorescence and exciting light waveforms, respectively, are amplified (typically to 1 –2 volts) by conventional operational amplifiers (e.g., Tektronix Type O). The phase shift between the two alternating voltages (same as that between delayed fluorescence and exciting light waveforms) is measured by standard phase meters operating in a conventional manner for measurement of phase difference between two electrical AC signals. Use of a phase meter with a digital readout increases accuracy (±0.2°). When the exciting waveform is not purely sinusoidal (e.g., a rotating cut out disc gives a square wave excitation) previous rejection of the higher harmonics in the two electrical signals is necessary for correct phase shift measurement at the fundamental frequency. Fundamental frequency can be isolated in both waveforms by well known means such as a pair of adjustable band-pass filters or a dual channel synchronous tracking filter (e.g., Ad-Yu Electronics Type 1034). A tracking filter is tuned via a synchronous converter to the fundamental frequency of the signals and offers the advantage of phase coherent outputs and a constant bandpass over a wide frequency range, as well as an improved signal-to-noise ratio.

The following examples further illustrate the practice of the present invention.

EXAMPLE 1

Part A

About 2 mm. thick platelets of an organic solid, in which mutual annihilation of triplet excitons is known to take place, were obtained by cleavage along the $ab$ plane of a melt-grown anthracene crystal. Triplet exciton lifetime in the specimens was measured to be $\tau=19.2$ msec. ($\beta=1/\tau=52$ sec.$^{-1}$). A platelet of $1\times1.5\times0.2$ cm.$^3$ is placed on the stationary support of the apparatus (FIG. 2) in such a way that the $a$ axis was along the polarization of the exciting beam. This orientation provided maximum delayed fluorescence signal and minimum double refraction of the beam. The exciting light was the expanded beam (ca. 8 mm. diameter) of a He-Ne laser (Spectra Physics Model 125) operating at a wavelength of 6,328 A.

Part B

Figure 3:
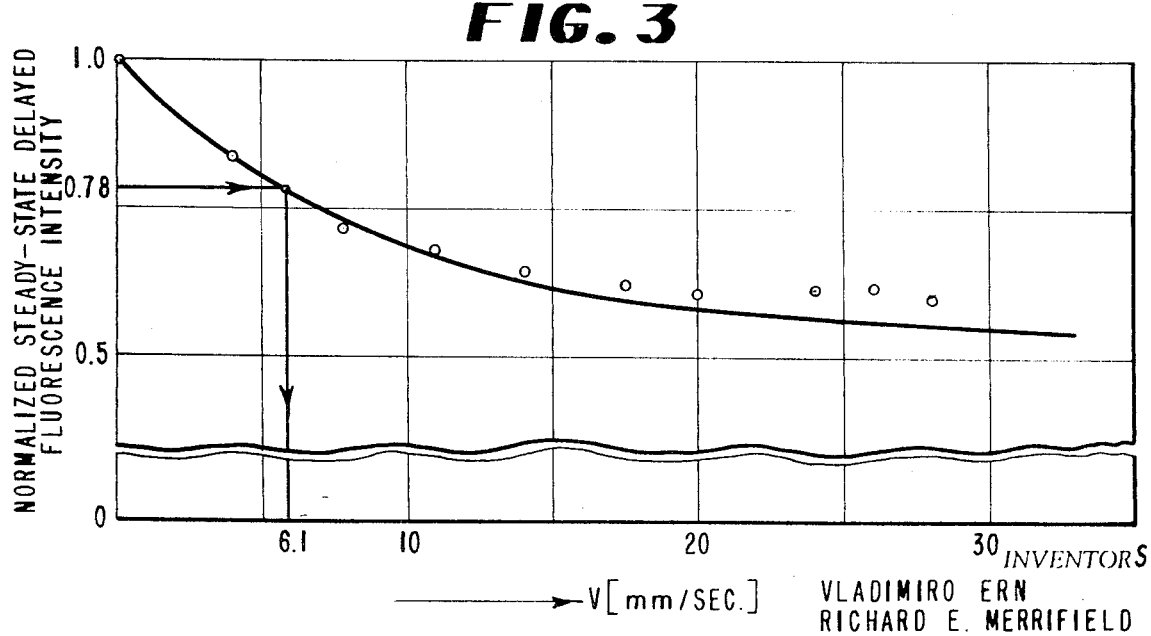
FIG. 3 is a plot of the steady state delayed fluorescence intensity versus ruling speed, $v$.

Delayed fluorescence intensity from the organic crystal ($ab$ plane anthracene platelet $2\times2\times0.2$ cm.$^3$) was monitored as a function of ruling speed by PM tube 17 (FIG. 2). With switch 30 in position B, output of the photomultiplier was fed to a recorder 29 (Speedomax, Leeds & Northrup Co.), and the level of delayed fluorescence intensity for each ruling speed ($v$) was recorded on a chart. Signal for stationary image was recorded periodically to provide an average reference level. FIG. 3 shows the relative decrease of delayed fluorescence intensity as a function of speed, observed for a 25 lines per inch ($x_o=1,016\mu$) ruling. Data (points) are plotted after normalization by the signal obtained with the stationary image.

The curve shown in FIG. 3 is the calibration curve for the setup of FIG. 2 operating in the constant intensity mode, i.e., with chopper 13 inoperative and switch 30 in position B. The apparatus can be used to measure speeds of rulings of known $x_o$ and conversely it can be used to measure the distance $x_o/2$ between two successive opaque strips of a ruling moving at a constant speed, $v$. For example, a ruling of $x_o=1$ mm. is placed underneath the anthracene crystal as shown in FIG. 2. A 1:1 image of the opaque stripes is formed in the crystalline material. Speeds and dimensions of the image have, therefore, a 1:1 relation to that of the ruling. With the ruling at rest, the recorder 29 reads 200 divisions (arbitrary units). The ruling is set in motion at an unknown speed, $v$, and the reading of the recorder 29 decreases to 159 divisions. As shown in FIG. 3, the value $159/200=0.78$ (normalized delayed fluorescence) measures from the intersection with the curve a speed $v=6.1$ mm./sec. for the ruling. Conversely, if a ruling of unknown $x_o$ is moved at constant speed $v=6.1$ mm./sec., a value of 0.78 for the normalized delayed fluorescence measures the distance $x_o=1.0$ mm., that is 0.5 mm. between the opaque strips.

The speed of a ruling of arbitrary known $x_o$ can be measured with the aid of the same calibration curve of FIG. 3 by multiplying the deduced value for the abscissa by the ratio $x_o$(mm.)/(mm.). That is, a value of 0.78 for the normalized delayed fluorescence for a ruling of $x_o=0.5$ mm., measures a ruling speed of $6.1\times0.5=3.05$ mm./sec.

EXAMPLE 2

Utilizing the means described in example 1, Part A, the following experiments were performed.

Part A

Figure 4:
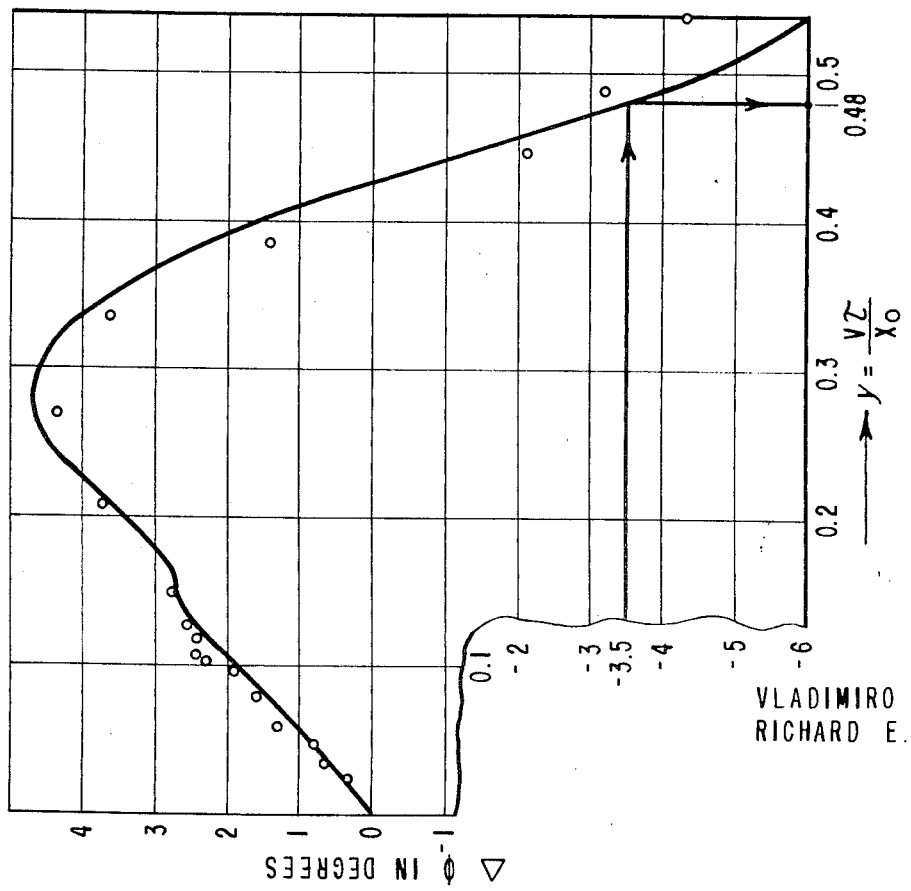
FIG. 4 is a plot of $\Delta\Phi_1$, the difference in phase angle at a given speed of ruling and at a stationary ruling versus the dimensionless parameter $y = v\tau/x_o$.

Beam intensity was periodically modulated with linear polarizer, 13, rotating at 720 r.p.m. This provided a first harmonic frequency of $f=24$ c.p.s. A ruling having 25 lines per inch was run at several speeds ranging from 1.1 to 25 mm./sec. Phase shift of first harmonic ($f=24$ c.p.s.) of delayed fluorescence waveform was measured at each speed. FIG. 4 shows the experimental results (small circles). The difference in phase shift ($\Delta\Phi_1=\Phi_1[v]-\Phi_1[o]$, in degrees) between the phase at a given speed ($\Phi_1[v]$) and the phase for the stationary ruling ($\Phi_1[o]$) is plotted as a function of the dimensionless parameter $y=v\tau/x_o$, where the speed $v$ is the variable, and the triplet exciton lifetime $\tau$ and image period $x_o$ are fixed parameters of the measurements. On the same graph, is plotted the phase response curve (continuous line) to speed as computed from the expression for phase angle given by equation 6, for $f\tau=0.46$.

The curve shown in FIG. 4 is the calibration for the apparatus of FIG. 2 operating in the periodically modulated light intensity mode, i.e., with switch 30 in position A, first harmonic frequency $f=24$ c.p.s., triplet exciton lifetime of anthracene crystal $\tau=19.2\times10^{-3}$ sec.). The measurement of the phase shift on phase meter 20 allows determination of parameter $y=v\tau/x_o$ from the calibration curve of FIG. 4. Since $\tau$ is a fixed parameter of the setup, measurement of $y$ is equivalent to a measurement of either $v$ or $x_o$. For example, a ruling of $x_o=1.0$ mm. is placed underneath the anthracene crystal ($\tau=19.2\times10^{-3}$ sec.) as shown in FIG. 2. A 1:1 image of the opaque stripes is formed in the crystalline material. Speeds and dimensions of the image have therefore a 1:1 relation to that of the ruling. With the ruling at rest the digital phase meter 20 reads 69.5°. The ruling is set in motion at an unknown speed $v$. The phase meter reading is 66.0°. The change in phase shift due to motion is then $\Delta\Phi=66.0°-69.5°=-3.5°$. As shown in FIG. 4 this yields for $y$ a value of 0.48. The unknown speed is therefore $$v=yx_o/\tau=0.48\times1/19.2\times10^{-3}=25 \text{ mm./sec.}$$

Conversely, if a ruling of unknown $x_o$ is moved at a constant speed of $v=2.5$ cm./sec., then the measured value of $\Delta\Phi=3.5°$ (i.e., $y=0.48$) measures a distance of $x_o/2=0.5$ mm. between the opaque strips of the ruling.

Part B

Figure 5:
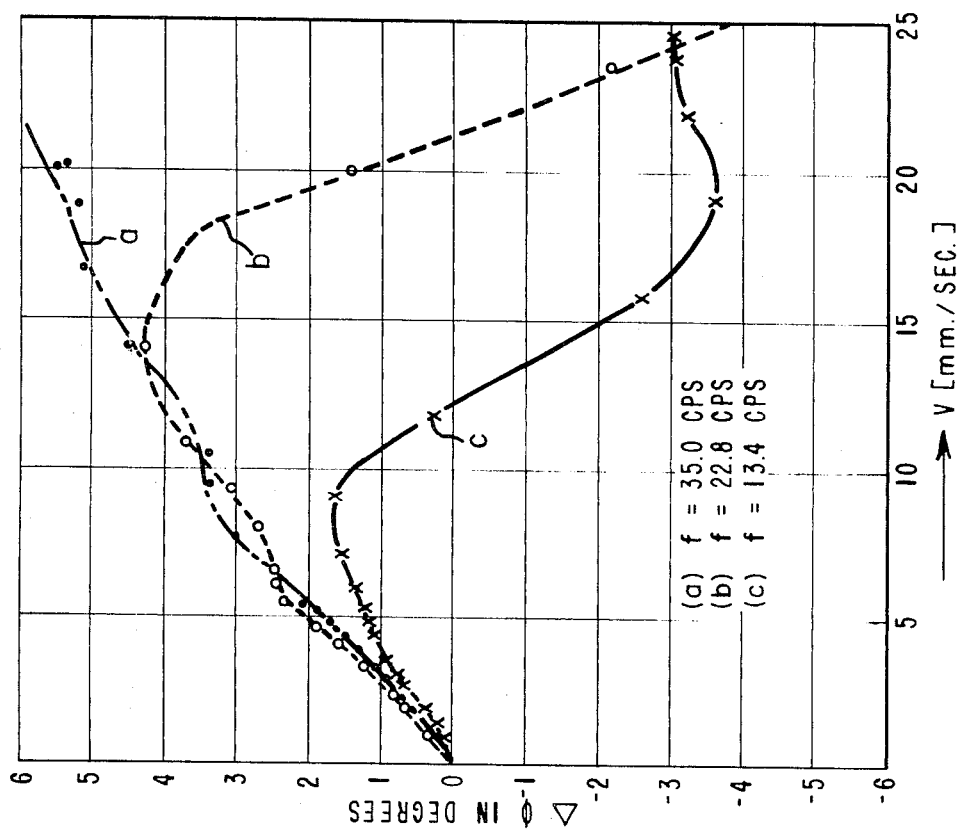
FIG. 5 is a plot of $\Delta\Phi_1$, versus image speed, $v$, for three different frequencies of intensity modulation.

Measurements were made to ascertain the effect of frequency of modulation of the image intensity on the response of phase shift of delayed fluorescence to image speed. The frequency of modulation of the exciting beam was varied in a known manner by adjusting the mechanical frequency of rotation of linear polarizer 13. At each frequency the phase shift of first harmonic of delayed fluorescence was measured as a function of image speed. FIG. 5 shows the observed changes in phase with speed for three different frequencies of intensity modulation, $f=35.0$ c.p.s., $f=22.8$ c.p.s. and $f=13.4$ c.p.s., respectively. It is clear that increase of frequency of modulation in an appropriate range can increase overall sensitivity to speed and shift the crossover point (maximum negative slope) of response to higher speeds. It is therefore possible to adjust the modulation frequency for optimum response for a given range of speeds of the image.

Part C

The effect of image detail (e.g., spatial period of the moving ruling) on the response of phase shift of delayed fluorescence waveform was studied. Changes in phase of first harmonic were measured for several rulings with spatial periods ranging from $x_o=127\mu$ to $x_o=1,000\mu$, for a frequency ($f$) of 35 c.p.s. FIG. 6 illustrates the results as a function of speed for two images with spatial periods differing by a factor of 3, $x_o=508\mu$ and $x_o=169\mu$, respectively. The same results are plotted in FIG. 7 as a function of the parameter $y=v\tau/x_o$. Triplet exciton lifetime $\tau$ is the only fixed parameter in the experiments. For a period of $x_o=169\mu$ triplet exciton diffusion effects become noticeable. Main effect is the reduction of amplitude of response.

EXAMPLE A

A typical example of utility for the present invention is determination of speed in a continuous manufacturing process where the product is advanced at a constant rate on a conveyor as it is subjected to the different steps of the process. In precision work, maintaining and/or controlling continuously the instantaneous speed of the conveyor can be important. This is accomplished with an assembly shown in FIGS. 8, 9 and 10. The principle of operation is the same as shown on and described in connection with FIG. 2.

A perforated strip 50 is added to one side of conveyor belt 31 and advances synchronously with it at speed, $v$. Perforations 48 (e.g., $2 \times 5$ mm.$^2$, shown in top view of FIG. 9) are equally spaced. The strip is illuminated from above by an expanded beam of a small commercial laser 32 (e.g., Helium—Neon 2 mW). Motor 49 rotates a linear polarizer 33 (e.g., 1-inch diameter) at a given frequency. The fixed polarizer 34 is set for maximum transmission with respect to polarization of a laser beam. The intensity modulated beam passes through the moving slits and falls on the speed sensing unit 35 (details in FIG. 10). Phase shift meter 38 measures the relative phase of electric signals 36 and 37, a function of the conveyor's speed, $v$. Electric signal 39 from the phase meter can be used to correct for any deviation from the desired speed by conventional methods.

Speed-sensing unit 35 comprises photomultiplier tube 41 (e.g., RCA 6199) in socket 42 enclosed in shielding pipe 43. The top of the pipe has an ambient lighttight arrangement consisting of a stack of blue filters 45 (e.g., CS 5–58 + 4–72) on which is set an organic crystal 44 showing delayed fluorescence (e.g., anthracene, 1-inch diameter, ⅛-inch thick) and a red filter 46 (e.g., CS 2–61) which admits the laser light. A small red-light sensitive diode 47 (e.g., Optoelectronics LS400) provides the reference signal 36 for the phase shift measurement of signal 37 from the photomultiplier 41, detecting blue fluorescence from the organic crystal 44.

The embodiments of the invention in which an exclusive property or privilege is claimed are defined as follows:

1. A device for detecting motion comprising
   a crystalline material in which radiation can produce triplet excitons which subsequently generate delayed fluorescence by mutual annihilation,
   optical means for directing light onto said crystalline material,
   first mounting means holding said crystalline material and said optical means in fixed relation,
   means for periodically modulating the intensity of said light,
   second mounting means holding said modulating means in the path of said light, and
   means for measuring the phase shift of the resulting time modulation of the delayed fluorescence with respect to that of the exciting light.

2. The device of claim 2 wherein said optical means is a laser device.

3. The device of claim 2 wherein said optical means comprises a laser device and a lens system.

4. The device of claim 1 wherein said optical means comprises a laser device and a beam-bending mirror.

5. The device of claim 1 wherein said crystalline material is selected from the group consisting of anthracene, 9,10-diphenylanthracene, 2-chloroanthracene, 2,t-butylanthracene, 1,8-dichloroanthracene, 1,5-dichloroanthracene, 4,5-iminophenanthrene, phenanthrene, 4,5-methylenephenanthrene, naphthalene, 1,4-dibromonaphthalene, pyrene, p-terphenyl, transstilbene, 4,4'-dimethoxystilbene, 9,9-bianthryl, tetracene and 2-bromofluorene.

6. The device of claim 5 wherein said crystalline material is anthracene.

7. The device of claim 1 wherein said modulating means is a mechanical chopper consisting essentially of a wheel with a cutout sector rotating at a constant speed.

8. The device of claim 1 wherein said modulating means is a mechanical chopper consisting essentially of a linear polarizer rotating at a constant speed and placed in between two fixed polarizers set for maximum transmission.

9. The device of claim 1 wherein said measuring means consists essentially of two photomultiplier tubes, a tracking filter and a digital phase shift meter.

10. The device of claim 9 wherein said crystalline material is directly attached to the face of one of said photomultiplier tubes.

* * * * *